United States Patent [19]

Michels

[11] Patent Number: 4,513,818

[45] Date of Patent: Apr. 30, 1985

[54] METHOD FOR REDUCING SCALE IN GEOTHERMAL SYSTEMS

[75] Inventor: Donald E. Michels, Whittier, Calif.

[73] Assignee: Republic Geothermal, Inc., Santa Fe Springs, Calif.

[21] Appl. No.: 477,955

[22] Filed: Mar. 23, 1983

[51] Int. Cl.³ .............................................. E21B 41/02
[52] U.S. Cl. ................................................. 166/244 C
[58] Field of Search ..................................... 166/244 C

[56] References Cited

U.S. PATENT DOCUMENTS 3,757,516  9/1973  McCabe ......................... 166/244 X Primary Examiner—Stephen J. Novosad
Assistant Examiner—Bruce M. Kisliuk
Attorney, Agent, or Firm—Curtis, Morris & Safford

[57] ABSTRACT

A method for reducing deposition of scale in geothermal wellbores and geothermal flash steam plants is described. Naturally occurring brines containing different amounts of dissolved solids and having contrasting chemical behavior are blended in controlled proportions to obtain improved properties in the mixture insofar as deposition of scale is concerned. The invention improves the usability of hypersaline brines, containing substantial quantities of sodium chloride, for power generation by blending them with cooler more dilute brines containing dissolved bicarbonate. By mixing the two brines within calculable limits of their proportions in the total produced fluid, deposition of sodium chloride and carbonate scales is avoided in the wellbore and in the downstream power generation equipment.

7 Claims, 1 Drawing Figure

U.S. Patent
Apr. 30, 1985
4,513,818
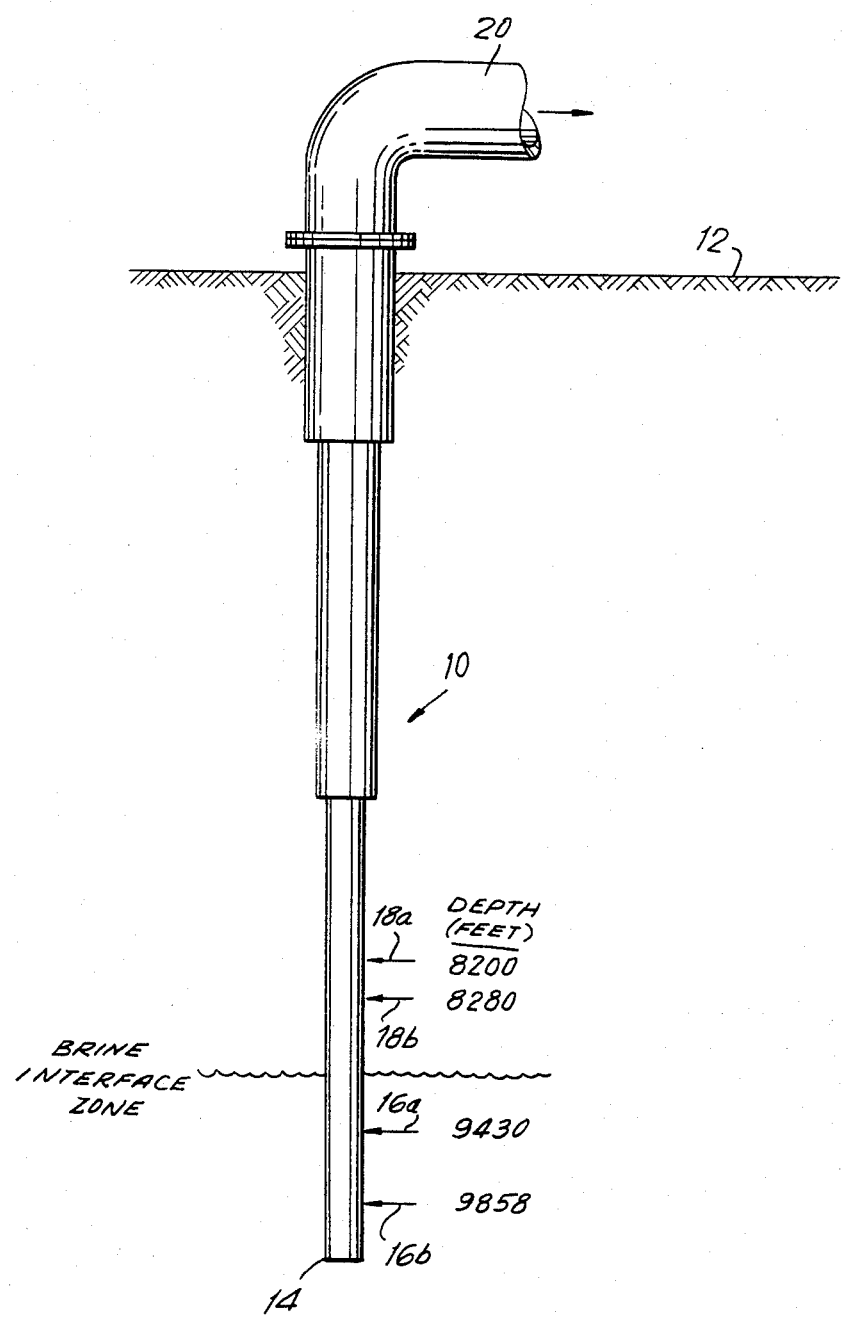

METHOD FOR REDUCING SCALE IN GEOTHERMAL SYSTEMS

FIELD OF THE INVENTION

This invention relates generally to methods for reducing scale and solids deposition in geothermal well systems. More specifically this invention relates to geothermal systems including wells for flowing hot geothermal water and steam plants for harnessing the energy in steam flashed therefrom. Even more specifically this invention relates to a method for combining discrete, naturally-occurring brines in ways to substantially reduce or eliminate the deposition of sodium chloride, calcium or iron carbonates and other deleterious salts encountered in geothermal energy production.

BACKGROUND OF THE INVENTION

In recent years and as a consequence of energy shortages throughout the world, much technical interest has been manifested in the development of sources of energy other than those relying on fossil fuels. Geothermal energy has for many years been viewed as a source of energy, in particular for electrical power generation, and has therefore in recent years been considered as an attractive alternate energy source. Geothermal energy does not result in significant production of gaseous pollutants and has attractive capital and operating cost benefits which are not enjoyed by conventional energy generation systems.

Geothermal energy sources typically rely on either a supply of steam or of superheated hot water found at varying depths below the surface of the earth. Sources of geothermal hot water are more common than geothermal steam and substantial effort has been made to extract heat energy from such sources and convert it to electrical power.

Typically this is accomplished by permitting the superheated water to flow out of a geothermal well, flashing it to form a steam phase, separating the available steam at the surface and driving a steam turbine with it and ultimately disposing of the remaining hot water.

Among the problems encountered in development of geothermal hot water wells for generation of electrical energy is the deposition of salts in the well and in the heat extraction and power generation equipment. It is not uncommon to have extremely high levels of dissolved solids in hot geothermal brines and as these brines are cooled in the flashing step and otherwise suffer dissipation of heat in the extraction procedure, these solids tend to deposit in the valves, pipes and other equipment. This causes fouling within the well and in surface pipe and equipment such as the steam separators. Typically, geothermal waters contain dissolved calcium, sodium and other minerals, and the salts which are deposited include sodium chloride, calcium and iron carbonates and heavy metal sulfides and silicates. The salt deposition necessitates either (1) frequent cleaning of the wellbore piping, and steam separators which is time consuming, expensive and disruptive of the operation; or (2) expensive chemical control by the introduction of additives to the fluid stream.

There are obvious thermodynamic advantages to be achieved by employing superheated brines at high temperatures. However, such brines may contain extraordinary amounts of dissolved salts and are referred to as hypersaline brines. Such brines may occur at temperatures up to 650° F. and contain total dissolved solids in the amount of 100,000 to 300,000 ppm. Such brines are difficult to flow continuously in geothermal energy recovery systems because of the severe tendencies they manifest to deposit dissolved solids in the wellbore and in the downstream equipment. Upon steam flash, the saltier brines become supersaturated in sodium chloride. The deposition of that salt results in a thick, tough coating which can block and occlude pipes and foul valves within a matter of hours. A more common scale, but one which deposits less rapidly, contains silica in combination with varying amounts of a number of heavy metals, in particular, iron. Nonhypersaline (dilute) brines are typically rich in bicarbonate and deposit a calcium carbonate scale when they are flashed.

In some areas, for example the Imperial Valley of California, hypersaline brines and nonhypersaline brines are encountered at different depths of a geothermal well, the hypersaline brines being typically overlain with a nonhypersaline brine. In such instances each of the brines is hot enough to be considered as a geothermal source. However, producing either brine separately is problematic because each brine manifests its peculiar ability to deposit solids.

OBJECTS OF THE INVENTION

It is a primary object of this invention to reduce the deposition of solids from naturally occurring brines in the process of extracting geothermal heat energy from those brines.

It is still a further object of this invention to reduce the deposition of sodium chloride from hypersaline brines and thereby increase the efficiency of geothermal wells and power generation systems relying upon such brines.

It is still a further object of this invention to reduce the deposits of carbonate scale from nonhypersaline brines.

SUMMARY OF THE INVENTION

These and other objects of this invention are achieved by blending controlled amounts of hypersaline brines and nonhypersaline brines encountered in geothermal wells. It has been found that if the two brines are blended in the wellbore prior to flashing, and, if the proportion of each of the brines is maintained within certain limits, then the continuous production of the mixture is more economical and technically simpler than is the production of either brine alone. By proper blending of the naturally occurring brines in certain proportions, serious solids deposition can be avoided and the wells become more productive in terms of mass flow rate and continuity of operation as compared to conventional wells operating on one or the other brine alone.

Hypersaline brines are typically mildly acidic, having a pH of 3.5 to 5.5 and they have a modest capacity to absorb chemical base while changing pH in small increments. Hypersaline brines typically contain considerable amounts of heavy metals.

The nonhypersaline brines, on the other hand, contain bicarbonate and are mildly basic. They have a small capacity to absorb chemical acids while changing pH in modest increments. Nonhypersaline brines commonly contain low concentrations of heavy metals.

Where equal masses of hypersaline brine, containing 250,000 ppm and nonhypersaline brine, containing 50,000 ppm are combined, the blend, containing 150,000 ppm is chemically more akin to the hypersaline parent in terms of its pH and relative concentrations of dissolved components. However, it has been found, that the mixed brine, after flashing, is sufficiently dilute in sodium chloride so that it does not deposit sodium chloride scale as would happen if the unmixed hypersaline parent were flashed. Similarly, this dilution technique reduces deposition of heavy metal sulfide scales from the hypersaline parent. A further benefit is that the blending results in sufficient consumption of the bicarbonate present in the dilute brine so that upon flashing no calcium carbonate is deposited.

It has thus been found that the blending significantly reduces the deposition of three generic types of scale deposits. A fourth type of scale, namely silica deposition with variable proportions of heavy metals can still occur from the blended brine, although there is some alteration in the scaling behavior as compared to the hypersaline parent.

BRIEF DESCRIPTION OF THE DRAWING

The invention is further described in the drawings.

FIG. 1 is a schematic representation of a specific geothermal well located in the Imperial Valley of California.

DETAILED DESCRIPTION OF THE PREFERRED EMBODIMENTS

In FIG. 1, reference numeral 10 refers generally to a wellbore as is well known in the art. The wellbore extends down below the surface of the earth 12 for a distance of 10,000 feet or more. At its lower end 14 it is within a source of hypersaline brine which may contain 250,000 ppm of dissolved solids. It passes through a cooler, nonhypersaline brine at a depth of approximately 8,200 feet. Reference numeral 16a and 16b represent the inflow of hypersaline brine from the lower zone into the wellbore and reference numerals 18a and 18b represent the inflow of the cooler, nonhypersaline brine from the overlying layer into the wellbore. The inflow of the respective brine components may be controlled by completing the well so as to exclude one or more of the inflows or by drilling deeper so as to intercept additional inflow zones.

The combined brines are brought to the surface and are discharged at reference numeral 20 and then passed to a power generation plant as is known in the art.

A well such as is depicted in FIG. 1 was flowed in a test for more than 30 days and during that period discharged 160,000,000 pounds of brine without scale-up of the wellbore and without scale-up of surface equipment by sodium chloride. The pH of the brine mixture was so acidic, that calcium carbonate was stable everywhere in the fluid flow path and did not deposit out. In contrast, a neighboring well which produced the pure hypersaline brine suffered sodium chloride scaling rates of about 1 mm/hr. on some valves and tank openings.

In other cases, geothermal wells in the same region were completed allowing a higher proportion of dilute brine to mix with the hypersaline brine. These wells experienced carbonate scaling in the production and mixing zones and ceased to yield geothermal fluid after a few hours due to plugging of most of the fluid flow path.

It has been discovered that the minimum and maximum fractions of the blended brine which can be derived from the nonhypersaline parent can be calculated from certain basic chemical and physical characteristics of the hypersaline and nonhypersaline parent brines, respectively.

The minimum fraction of the mixture to be derived from the nonhypersaline parent depends on the amount of dilution needed to ensure that all of the sodium in the blended brine remains dissolved after the blended brine is flashed and is further cooled by normal dissipation of heat in the plant system prior to disposal of the spent brine mixture.

The maximum tolerable amount of dilute brine in the mixture is dependant on the formation of iron carbonate which occurs in the wellbore near the point of mixing when the acid component of the hypersaline brine is consumed by the more basic nonhypersaline brine.

The minimum amount of dilute brine which is required to avoid deposition of sodium chloride from the hypersaline brine component can be calculated. The following calculation refers to a geothermal flash steam plant wherein the blend of brines is flashed and then disposed of at a minimum temperature, $T_m$, after the flashing step and after dissipative heat losses have taken place through the downstream parts of the plant to the point of fluid disposal.

In order to avoid sodium chloride scaling, the solubility product constant of sodium chloride, $S_m = [Na]_m[Cl]_m$ at $T_m$ must exceed the ion product, $C = [Na][Cl]$ that actually exists in the brine after flashing. These conditions for non-scaling can be related to the ion product, $C$, in the brine before flashing. This relationship is set forth in Equation 1

$$S_m > C = C_I(1-F)^{-2} = [Na]_I(1-F)^{-1}[C-1]_I(1-F)^{-1} \quad (1)$$

wherein the subscript I represents the concentrations before flashing and F represents the mass fraction of the brine which flashes to steam.

Additionally, the pre-flash concentrations of Na and Cl in the mixture can be expressed as weighted averages of their respective concentrations in the separate component brines, as in Equations 2 and 3, wherein f represents the fraction of dilute brine (a) in the mixture.

$$[Na]_I = (Na)_a(f) + (Na)_b(1-f) \quad (2)$$

$$[Cl]_I = (Cl)_a(f) + (Cl)_b(1-f) \quad (3)$$

Combining equations 1, 2, and 3 and the criterion for non-scaling yields Equation 4 from which (f) can be calculated.

$$S_m \geq [(Na)_a f + (Na)_b(1-f)][(Cl)_a f + (Cl)_b(1-f)](1-F)^{-2} \quad (4)$$

In equation (4), F indicates the mass fraction of the mixture which flashes to steam. The value of (f) in equation 4 which corresponds to $S_m$ being equal to the right hand side is the minimum fraction of dilute brine (a) that will successfully prevent sodium chloride deposition. Larger values for (f) and the fluid fraction also prevent sodium chloride deposition and are therefore useful in the sense of this invention.

However, if too much dilute brine (a) is included in the mixture then other detrimental chemical reactions can occur. It is part of this invention to also show how to calculate the maximum practical value for $(f_{max})$ . . .

The maximum fraction of the cool, dilute, nonhypersaline brine (a) that would be practical to include in the brine blend is calculated on the basis of the acid-base capacities of the separate brines and the establishment of a critical pH which must not be exceeded.

For example, $FeCO_3$ might form at pHs above the value M where $A > M > B$ and these variables represent the pH values for brines (a), mixture (m), and (b), respectively. If $C_a$ and $C_b$ represent the base and acid buffer capacities per unit mass of brines (a) and (b) between pHs $A \to M$ and $B \to M$, respectively, then the ratio $C_a/C_b$ is the critical mixing ratio beyond which $FeCO_3$ or other material might begin forming a heavy scale. The fraction (f) of brine (a) at such a critical mixing ratio is given by equating the products of unit acid-base capacities and mass fractions as in Equation 5, $$(C_a)f = C_b(1-f) \quad (5)$$

which can be rearranged to Equation 6

$$f_{max} = \frac{C_b}{C_a + C_b} \quad (6)$$

Example 1 illustrates the use of the foregoing equations in a system as described in FIG. 1. In designing the fluid blending in the wellbore, the value of f supplied by equation (4) is a minimum practical value and that given by equation (6) is a maximum practical value.

EXAMPLE 1

The following data approximate the operation of the geothermal well described in FIG. 1 and provide data for the following example calculations. A potential flash fraction of 0.25 is assumed for the mixture.

| Factor | Dilute Brine (a) | Concentrated Brine (b) |
|---|---|---|
| Na concentration (ppm) | 17,000 | 53,000 |
| Cl concentration (ppm) | 29,000 | 147,000 |
| pH | 8.2 | 4.5 |
| Buffer capacity to pH 5.5 (meq/kg) | 15 | 75 |

At 80° C., a possible minimum temperature for plant operation, the solubility product constant for NaCl in residual geothermal brine is $1.3 \times 10^{-10}$ when ppm units are used. Using the values above plus $F = 0.25$ in Equation 4 yields $f_{min} = 0.037$ and in Equation 6, $f_{max} = 0.83$.

Thus, all mixtures in the range of 3.7 to 83 percent of the dilute brine (a) would simultaneously avoid NaCl scale and carbonate scale. In actual operation the well described in FIG. 1 produced a brine blend which included 73% of the dilute component.

The invention provides an extremely valuable tool for making decisions in drilling operations. Testing a geothermal well is inadvisable if the mixed brine has a potential to deposit carbonate scale. For example, when drilling operations encounter substantial fluid production potential, the drilling operators must decide whether to continue drilling or to stop to test the well in its present state. In the example relating to FIG. 1, the dilute brine (a) had a total dissolved solids content (TDS) of 60,000 ppm and brine (b) had a (TDS) of 250,000 ppm. The critical mixture of 83%(a) and 17%(b) would have a (TDS) of about 92,300 ppm, i.e., nominally about 100,000 ppm. The calculations described above provide a criterion for deciding whether the brine has a scale deposition tendency.

Thus in drilling production wells in a geothermal field where this kind of experience is available, the following steps can be followed.

(1) Upon reaching rocks of commercial temperatures, identify each brine inflow and estimate its TDS.
(2) Upon reaching subsequent inflows, estimate the TDS of the separate inflows or of the mixtures.
(3) If TDS of a mix is less than 100,000 ppm, continue to drill ahead. Attempts to produce pure liquid or a blend at this point risks calcium carbonate deposition due to flashing or iron carbonate scaling due to mixing outside the critical proportions.
(4) If TDS of mix is greater than 100,000 ppm and if tested production rate appears commercial, completion of the well is advised.
(5) If TDS of mix is greater than 100,000 ppm but tested production rates are not commercial, drill ahead to intercept additional production zones.
(6) If NaCl exceeds the amount which can be safely flashed and cooled without NaCl deposition, attempt to obtain minor dilute brine, perhaps by perforating the well casing in selected places.

As will be apparent to those skilled in the art the blending techniques can be adapted to prevent deposition of various salts contained in hypersaline parent brines and in the more dilute parent brines as well. Two or more brines can be combined to obtain advantages in the mixture not available to either brine parent. Calculations other than those described above will be apparent to those skilled in the art.

What is claimed is:

1. A method for reducing scale deposits in geothermal wellbores, surface piping, and heat energy extraction equipment along the geothermal fluid flow path wherein hot brine is removed from a well and used as a source of heat energy comprising the step of blending at least two naturally occurring hot brines in a single wellbore, each of said brines having interactive chemical qualities which when mixed reduces the quantity of residual, scale-forming constituents of the brine mixture from those of the separate, unmixed brines.

2. A method as recited in claim 1 wherein hypersaline brines are blended with nonhypersaline brines.

3. A method as recited in claim 1 wherein the deposition of sodium chloride from hypersaline brines flowed from geothermal wells is reduced by blending such hypersaline brines in a wellbore with nonhypersaline brines.

4. A method as recited in claim 1 wherein the heat energy extraction equipment is a steam separator or a plurality of steam separators.

5. A method for reducing the deposition of carbonate scales in geothermal wellbores, surface piping, and heat energy extraction equipment along the geothermal fluid flow path as recited in claim 1 wherein a naturally occurring hypersaline brine acidic in character and a non-hypersaline brine rich in bicarbonate are blended in such proportions as to reduce the deposition of carbonate scales as contrasted with methods in which the said nonhypersaline brine could be employed alone.

6. A method as recited in claim 1 wherein the deposition of sodium chloride, calcium or iron carbonates, and heavy metal sulfides is reduced by blending a plurality of naturally occurring brines occurring at different depths of a single wellbore in a blending proportion calculated to reduce the aforesaid scaling.

7. A method for reducing the deposition of scale in geothermal wellbores, surface piping, and heat energy extraction equipment along the geothermal fluid flow path wherein hot brine is removed from a well, flashed to produce steam and the steam is used to drive power generation means by blending a naturally occurring hypersaline brine with a nonhypersaline brine in a wellbore prior to flashing of the blended brine, the proportion of hypersaline brine being not less than $f_{min}$ and not greater than $f_{max}$, said $f_{min}$ and $f_{max}$ being calculated according to the following equations:

$$S_m = [(Na)_a f_{min} + (Na)_b(1-f_{min})][(Cl)_a f_{min} + (Cl)_b(1-f_{min})](1-F)^{-2}$$

$$f_{max} = \frac{C_b}{C_a + C_b}$$

wherein $T_m$ = minimum temperature of the blended plant brine after steam flashing and after dissipative heat losses have taken place throughout the plant up to the point of brine disposal;

$S_m$ = solubility product constant of sodium chloride $[Na_m][Cl_m]$ at $T_m$

C = actual ion product in the blended brine disposed from the plant at $T_m$ C = [Na][Cl]

I = subscript denoting initial concentration of sodium and chloride ion in blended brine prior to flashing a,b = subscripts denoting the concentration of sodium and chloride ion in the nonhypersaline component and hypersaline components, respectively of the blend f = mass fraction of nonhypersaline brine, a, in the blend $f_{min,max}$ = minimum and maximum fractions, respectively, of the nonhypersaline brine to avoid deposition of sodium chloride and calcium or iron carbonate scale F = mass fraction of the blended brine which flashes to steam A,M,B = pH values for brine a, the blend (m), and brine b $C_a, C_b$ = base and acid buffer capacities per unit mass of brines a and b in the range of pH, where A > M > B.

* * * * *